US007172007B1

(12) United States Patent
Hui

(10) Patent No.: US 7,172,007 B1
(45) Date of Patent: Feb. 6, 2007

(54) REINFORCING RING APPLICATOR

(76) Inventor: John Hui, 5 Hutton Centre Dr., Suite 830, Santa Ana, CA (US) 92707

(*) Notice: Subject to any disclaimer, the term of this patent is extended or adjusted under 35 U.S.C. 154(b) by 106 days.

(21) Appl. No.: 11/092,079

(22) Filed: Mar. 29, 2005

(51) Int. Cl.
*B32B 37/10* (2006.01)
*B29C 65/00* (2006.01)
*B32B 37/18* (2006.01)
*B65H 37/04* (2006.01)

(52) U.S. Cl. ...................... 156/540; 156/539; 156/564; 156/579; 277/572; 277/575; 277/585; 269/909

(58) Field of Classification Search ................ 156/230, 156/258, 297, 299, 494, 539, 564–565, 570, 156/579–581; D19/27, 32, 66, 99; 16/108; 277/572, 575, 585; 269/13, 14, 16, 287, 269/909
See application file for complete search history.

(56) References Cited

U.S. PATENT DOCUMENTS

| | | | | |
|---|---|---|---|---|
| 2,353,232 | A | 7/1944 | Greene | |
| 2,441,821 | A | 5/1948 | Kendall | |
| 2,512,822 | A | 6/1950 | Barsh | |
| 2,561,387 | A | 7/1951 | Forese | |
| 2,583,944 | A | 1/1952 | Hirszson et al. | |
| D193,231 | S | 7/1962 | Klein | |
| 3,898,919 | A | 8/1975 | Grimaldi, Jr. | |
| 3,925,144 | A | 12/1975 | Lowe et al. | |
| 4,007,653 | A | 2/1977 | Cady | |
| 4,072,554 | A | 2/1978 | McKibben | |
| 4,289,565 | A | 9/1981 | Wilkins | |
| 4,310,379 | A | 1/1982 | Harrison | |
| 4,713,995 | A | 12/1987 | Davi | |
| 4,746,394 | A | 5/1988 | Sueta et al. | |
| 4,826,561 | A | 5/1989 | Carroll | |
| 4,909,893 | A | 3/1990 | Lee | |
| 5,188,694 | A | 2/1993 | Hashida et al. | |
| 5,340,229 | A | 8/1994 | Schwartzman | |
| 5,658,421 | A | 8/1997 | Carroll | |
| 6,206,070 | B1 | 3/2001 | Salmon | |
| 6,397,652 | B1 | 6/2002 | Sollami | |
| 6,789,593 | B1 | 9/2004 | Aono et al. | |
| 6,863,108 | B1 * | 3/2005 | Hui | 156/513 |

* cited by examiner

*Primary Examiner*—Melvin Mayes
*Assistant Examiner*—Sonya Mazumdar

(57) ABSTRACT

A reinforcing ring applicator is provided to receive cartridges of reinforcer rings for applying flat, adhesive-coated annular reinforcement rings onto sheets of material about perforations which have been formed in the sheets of material. The reinforcer ring cartridge is a disposable item comprised of an annular backing member releaseably attachable to the reinforcing ring applicator. A reinforcing ring mounting post is frictionally engaged in a central aperture in the annular backing member. The reinforcer mounting post has a cylindrical, corrugated exterior surface and a lower tip formed with a plurality of separate, downwardly and radially inwardly directed, resilient deflectable fingers projecting therefrom. A plurality of flat, annular reinforcing rings are stacked one atop another and are releaseably and frictionally engaged with the mounting post by the corrugations thereof. By pressing downwardly on a plunger of the applicator, the reinforcer ring cartridge backing plate and the reinforcing rings therebeneath are pushed downwardly relative to the reinforcing ring mounting post. The lowermost reinforcing ring is thereupon attached to the upper surface of a flat sheet of material, with the remaining reinforcing rings being shifted longitudinally in incremental steps toward the lower tip of the reinforcer mounting post.

9 Claims, 10 Drawing Sheets

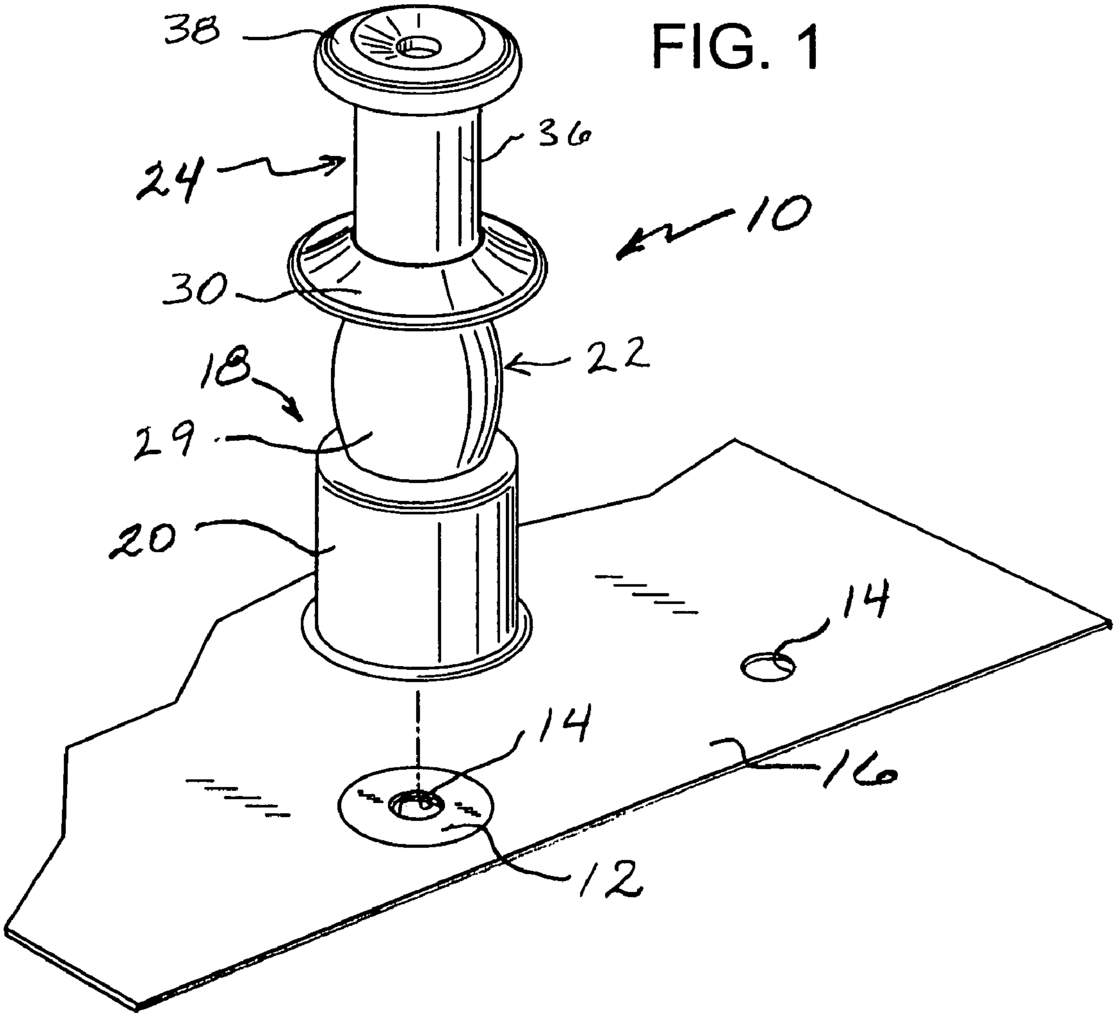
FIG. 1
FIG. 2
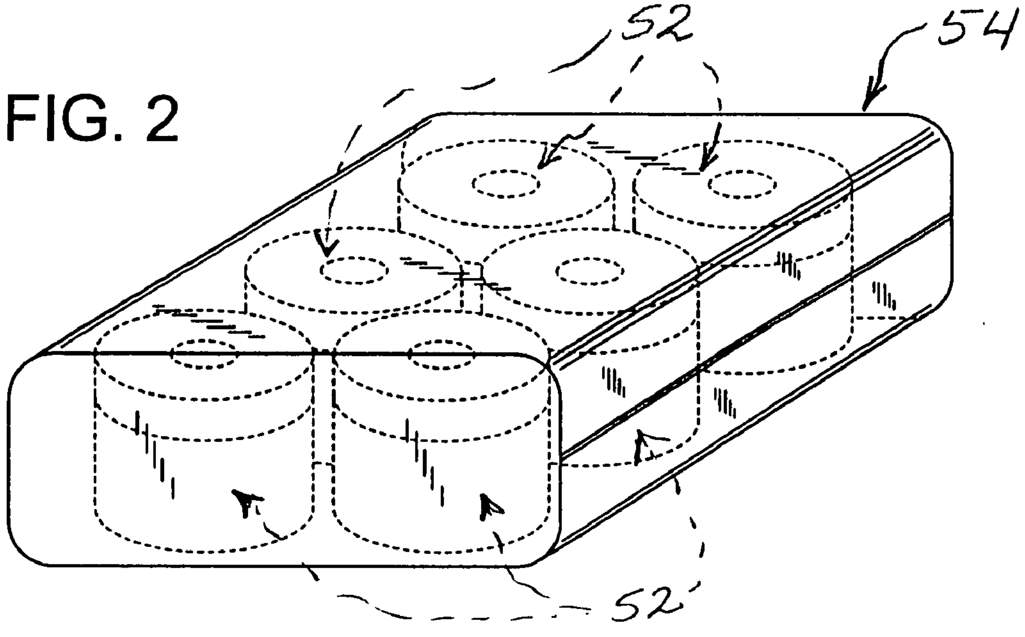

REINFORCING RING APPLICATOR

BACKGROUND OF THE INVENTION

1. Field of the Invention

The present invention relates to a reinforcing ring applicator for applying reinforcing rings about perforations in sheets of material and also cartridges for use in such an applicator.

2. Description of the Prior Art

For years a problem has existed in that considerable stress is often applied to the structure of papers fastened in files in the area immediately surrounding holes punched in the paper near the paper edge. The papers then tear through the short distance of material between the holes and the edges of the sheets of paper near which they formed. When this occurs the sheets will no longer remain in the file or binder in which they are stored.

One system that has been available for many years for remedying this situation is the use of flat, annular reinforcing rings that may be secured to the areas surrounding the punched holes. These reinforcing rings are typically formed of a material of greater strength than the paper or other sheet material in which the holes are punched. The reinforcing rings are coated with either a moisture-sensitive or pressure-sensitive adhesive and are applied to the sheet of paper or other material about holes formed therein once the holes have been punched.

The principal problem with this prior arrangement is that it has historically been performed manually. The task of reinforcing punched holes in the hundreds, and even thousands, of sheets of paper that are secured in files by the manual application of such reinforcing rings is often so labor intensive as to be impractical. Consequently, this system of reinforcement, while used to some extent, is not prevalent.

Various reinforcing ring applicators have been devised for concurrently punching perforations in sheets of material such as paper or plastic, so that these sheets may be held within an office filing article such as a ring binder or a file folder employing pronged fasteners. Such conventional combination punchers and reinforcers typically employ punching mechanisms that are operated by a lever to form one or more perforations in a sheet of material, and a reinforcer application system for contemporaneously reinforcing an area surrounding the perforations. The articles providing reinforcement may take the form of patches of adhesive tape or annular, reinforcing wafers with a pressure-sensitive adhesive thereon.

While the combination hole punchers and reinforcers are quite useful, often the need for reinforcement of the edges of sheets of paper and other material in which perforations have been formed does not become apparent until after the holes have been punched. Consequently, a need exists for a simple system for quickly and economically applying reinforcement rings about existing perforations in sheet material.

SUMMARY OF THE INVENTION

One object of the present invention is to provide a reinforcement ring applicator for applying reinforcing rings about perforations in sheets of material that is easy and economical to use and which applies the reinforcing rings very rapidly. By stacking rings in a cartridge the reinforcement rings can be rapidly applied, one after the other.

A further object of the invention is to provide a hand-held reinforcement ring applicator which can be easily stored and which can be operated with one hand.

A further object of the invention is to provide a system in which reinforcing ring cartridges can be quickly and easily replaced in a reinforcement applicator mechanism.

A further object of the invention is to provide a cartridge of stacked reinforcing rings which allows the lowermost ring, and only the lowermost ring, to be dispensed and attached about an aperture in a sheet of paper or other flat material.

While conventional reinforcement ring cartridges for reinforcement ring applicators have been devised, the conventional cartridges exhibit certain operating defects. For one thing, very frequently two, three, or even more reinforcement rings will be dispensed from the cartridge during operation of a conventional ring applicator. This produces considerable wastage, since only the lowermost reinforcement ring is applied to the sheet material about a perforation formed therein. Furthermore, it slows down the process of applying reinforcement rings to a number of sheets of material, since the excess rings left unattached with each operation of a conventional applicator tool must be removed.

A further difficulty with conventional reinforcement ring cartridges is that they are cumbersome to extract from the applicator, and therefore difficult to replace. In contrast, the reinforcement ring cartridge of the present invention may be easily snapped into position and the ring-carrying mechanism easily ejected once all the reinforcement rings have been applied onto sheets of material about perforations therein.

In one broad aspect the present invention may be considered to be a reinforcer ring cartridge. The reinforcer ring cartridge of the invention is comprised of an annular pressure plate, a reinforcer mounting post, and a plurality of flat, annular reinforcing rings disposed in a stack upon the mounting post. The pressure plate defines a central aperture therethrough. The reinforcer mounting post is formed with a series of raised, annular, radially projecting ribs on its outer surface. The ring mounting post has a ring dispensing tip with a plurality of separate, radially inwardly deflectable converging fingers formed thereon. The reinforcing rings each have an undersurface to which a pressure-sensitive adhesive has been applied. The undersurfaces of the flat reinforcing rings are all oriented to face away from the pressure plate.

In another broad aspect the invention may be considered to be an applicator for applying reinforcing rings about perforations in sheet material. The reinforcing ring applicator of the invention is comprised of an upright frame, a plunger mounted in the upright frame, a spring biasing the plunger relative to the frame, and a reinforcer ring cartridge. The frame is an upright structure including a lower skirt portion forming a lower reinforcement cartridge cavity therewithin. The frame also has an upper grip portion forming a plunger cavity directly above the reinforcement cartridge cavity and in coaxial alignment therewith. The plunger is mounted in the upright frame for reciprocal movement in the plunger cavity. The plunger has a lower extremity that includes a cartridge-engaging member. The spring biases the plunger toward a retracted position protruding upwardly from the frame and away from the reinforcement cartridge cavity.

The reinforcer ring cartridge includes an annular backing plate releaseably attached to the cartridge-engaging member of the plunger, a reinforcer mounting post mounted to the backing member and having a corrugated, cylindrical outer surface, and a lower tip. The mounting post tip is formed with a plurality of separate, downwardly and radially inwardly directed, resiliently deflectable fingers projecting therefrom.

Each of the flat, annular reinforcing rings has an undersurface coated with a pressure-sensitive adhesive and an opposite top surface. The top surface may be coated with a release agent. The reinforcing rings are stacked atop each other about the reinforcer mounting post. The reinforcing rings are engaged by friction on the corrugated surface of the reinforcer mounting post. The reinforcing rings are incrementally advanced along the reinforcer mounting post toward the lower tip of the mounting post by repeated depression of the plunger and by resilient, radially inward flexure of the fingers of the mounting post tip. In this way the lowermost of the reinforcing rings is detached from the reinforcer mounting post when pressed against a flat sheet of material located therebeneath. As it is dispensed it is attached to the sheet of material. The requisite pressure is applied by depression of the plunger against the reinforcer cartridge backing plate.

Preferably the ring dispensing tip is hollow and is divided into the converging fingers by a plurality of radially directed, longitudinally extending slots. Preferably the slots are formed at ninety degree intervals about the circumference of the ring dispensing tip so that the ring dispensing tip is formed with four converging fingers.

Preferably also, an annular, resilient pressure distribution washer is located between the pressure plate and the reinforcing rings. The pressure distribution washer is axially compressed slightly with the application of downward pressure from the pressure plate toward the sheet of material to ensure a uniform application of pressure over the entire annular area of each reinforcement ring as it is applied to the sheet of material.

The pressure plate is engaged by the force of friction upon the outer surface of the mounting post, so that the pressure plate is moved incrementally in an axial direction toward the ring dispensing tip with the dispensation of each reinforcing ring. The pressure plate preferably resides in contact with at least some of the radial ribs of the outer surface of the mounting post. The pressure plate is engaged with the radial ribs in registration therewith only by the force of friction. The radial ribs or corrugations are preferably configured with a sawtooth shape so as to allow incremental advance of the reinforcing rings only in a longitudinal direction toward the lower tip of the mounting post, and not in the opposite longitudinal direction.

Preferably the plunger of the applicator is a hollow, tubular structure. Also, the applicator is preferably comprised of a cartridge gauge rod having upper and lower ends disposed within the plunger. The cartridge gauge rod is biased toward the reinforcer cartridge by a cartridge gauge spring. Therefore, as the supply of reinforcing rings nears depletion, the reinforcer mounting post is forced sufficiently far up through the annular pressure plate or backing member so that it pushes up against the lower end of the cartridge gauge rod. This pressure forces the upper end of the cartridge gauge rod up and out of the plunger as the plunger is depressed against the reinforcer cartridge backing plate.

Preferably, the upper end of the cartridge gauge rod is provided with a visually prominent indicia. As the supply of reinforcing rings nears depletion, the operator of the applicator is alerted to the imminent dispensation of the last reinforcing ring by the protrusion of the visually prominent indicia at the upper end of the cartridge gauge from the top of the applicator grip portion.

The invention may be described with greater clarity and particularity by reference to the accompanying drawings.

DESCRIPTION OF THE DRAWINGS

FIG. 1 is a perspective view illustrating a preferred embodiment of a reinforcement ring applicator according to the invention as used in applying reinforcing rings about existing perforations in a perforated sheet of material.

FIG. 2 is a perspective view of a supply of reinforcer ring cartridges according to the invention, as packaged for sale and storage.

DESCRIPTION OF THE EMBODIMENT

Figure 3:
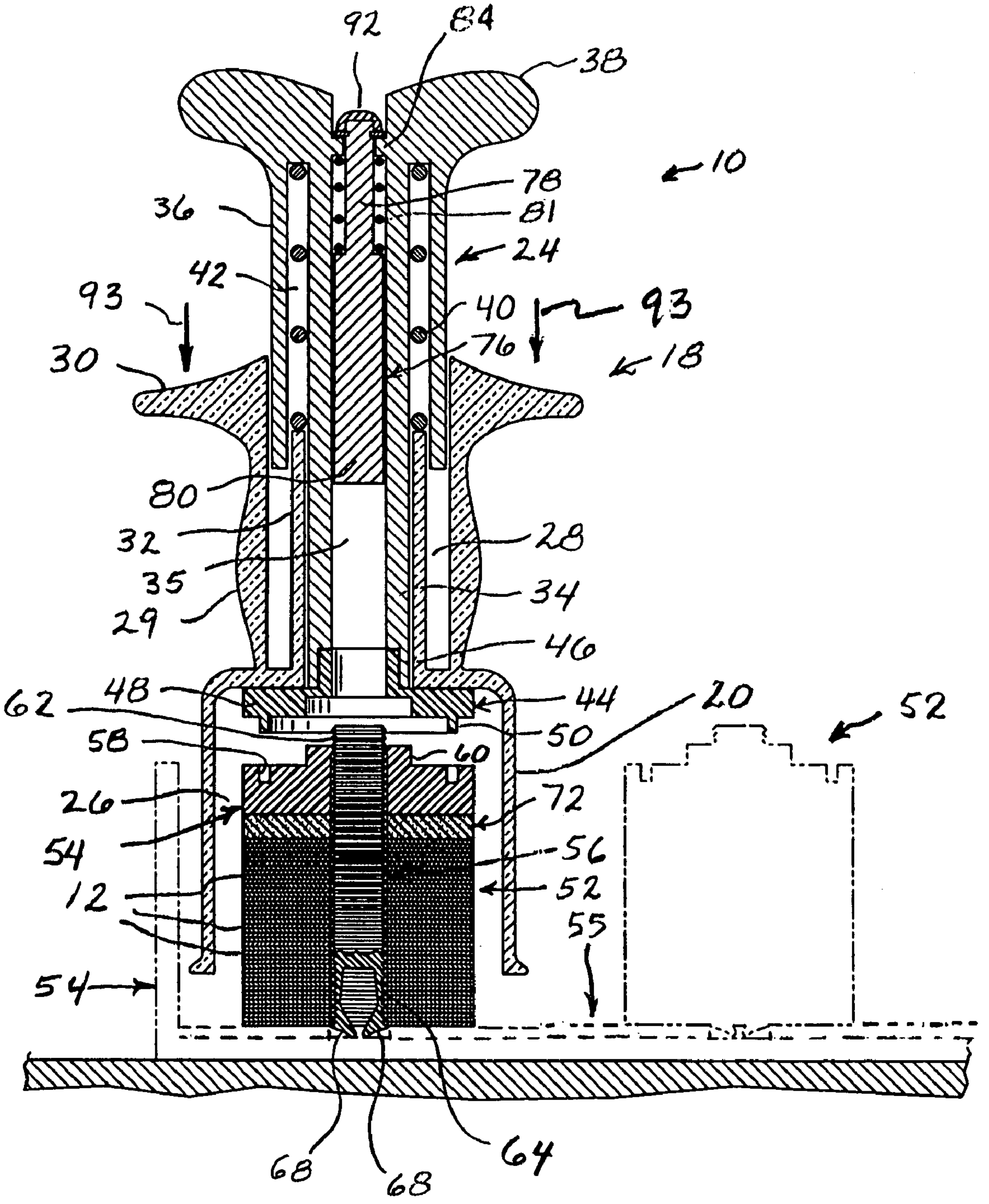
FIG. 3 is a sectional elevational view illustrating the manner of loading the applicator of FIG. 1 with a single one of the cartridges indicated in FIG. 2.

FIG. 1 illustrates a preferred embodiment of a reinforcing ring applicator indicated generally at 10. The applicator 10 is used to apply reinforcing rings 12 from a reinforcing ring cartridge 52 about preformed perforations 14 in sheets of material, such as the sheet of paper 16 illustrated in FIG. 1. The applicator 10 is constructed with an upright, annular frame 18 including a lower skirt portion 20 and an upper grip portion 22. The frame 18 is preferably a unitary structure formed of clear, transparent plastic. The applicator 10 also includes a plastic plunger 24 mounted in the upright frame 18 for reciprocal movement relative thereto.

Figure 4:
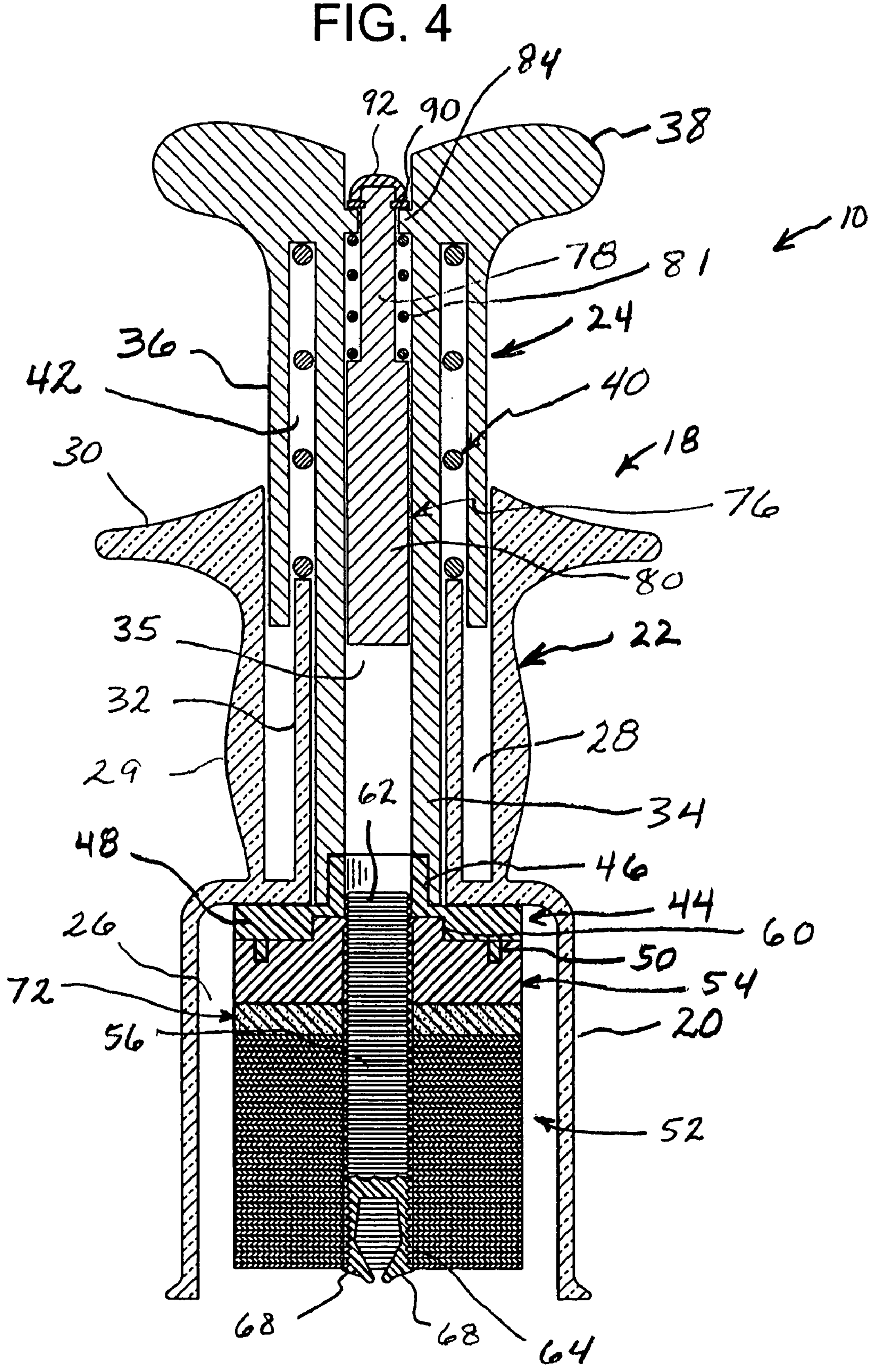
FIG. 4 is a sectional elevational view illustrating the engagement of a single cartridge on the applicator.

As illustrated, for example, in FIG. 4, the lower skirt portion 20 of the applicator frame 18 forms a lower, generally cylindrical reinforcement cartridge cavity 26 within its confines. The grip portion 22 of the frame 10 forms a plunger cavity 28 therewithin, located directly above the reinforcement cartridge cavity 26 and in coaxial alignment therewith.

The grip portion 22 of the applicator frame 18 includes an outer tubular portion 29 terminating at its lower extremity in a junction with the applicator skirt portion 20. At the upper extremity the frame 18 may terminate in an optional radially outwardly directed annular flange 30. The grip portion 22 also defines an inner, tubular, generally cylindrical plunger guide 32 located radially within the confines of the outer tubular portion 29 and centered atop the skirt portion 10.

The plunger 24 is a hollow, tubular structure formed with an elongated, generally cylindrical inner cartridge gauge guide and cartridge engagement portion 34 and a shorter, outer tubular main spring housing portion 36. Both the cartridge engagement portion 34 and the main spring housing 36 project downwardly from an annular, radially outwardly projecting plunger handle 38. The main spring housing 36 is located concentrically about and in coaxial alignment with the cartridge gauge guide and cartridge engagement portion 34. The inner portion 34 defines a cartridge gauge passageway 35 within its structure.

The main spring 40 is a compressible coil spring that is disposed within a main spring cavity 42 defined between the inner portion 34 and the outer spring housing 36. The lower end of the main spring 40 bears against the upper edge of the plunger guide tube 32, while the upper end of the main spring 40 bears against the underside of the handle 38. The main spring 40 thereby biases the plunger 24 upwardly relative to the frame 18 toward a retracted position protruding upwardly from the frame 18 and away from the reinforcement cartridge cavity 26.

The lower end of the cartridge gauge guide and cartridge engagement portion 34 terminates in a tip of reduced wall thickness that forms an interior bearing ledge adapted to receive a metal, reinforcer cartridge mount 44. The reinforcer cartridge mount 44 has a tubular, relatively narrow diameter upwardly projecting annular boss 46 that fits tightly within the lower tip of the cartridge gauge guide and cartridge engagement portion 34 and against the bearing ledge formed therewithin. At its lower end the reinforcer cartridge mount 44 has a generally flat, radially outwardly directed annular cartridge-engaging disc plate 48 that includes a circular, annular, axially downwardly projecting cartridge-engaging ring 50.

Figure 11:
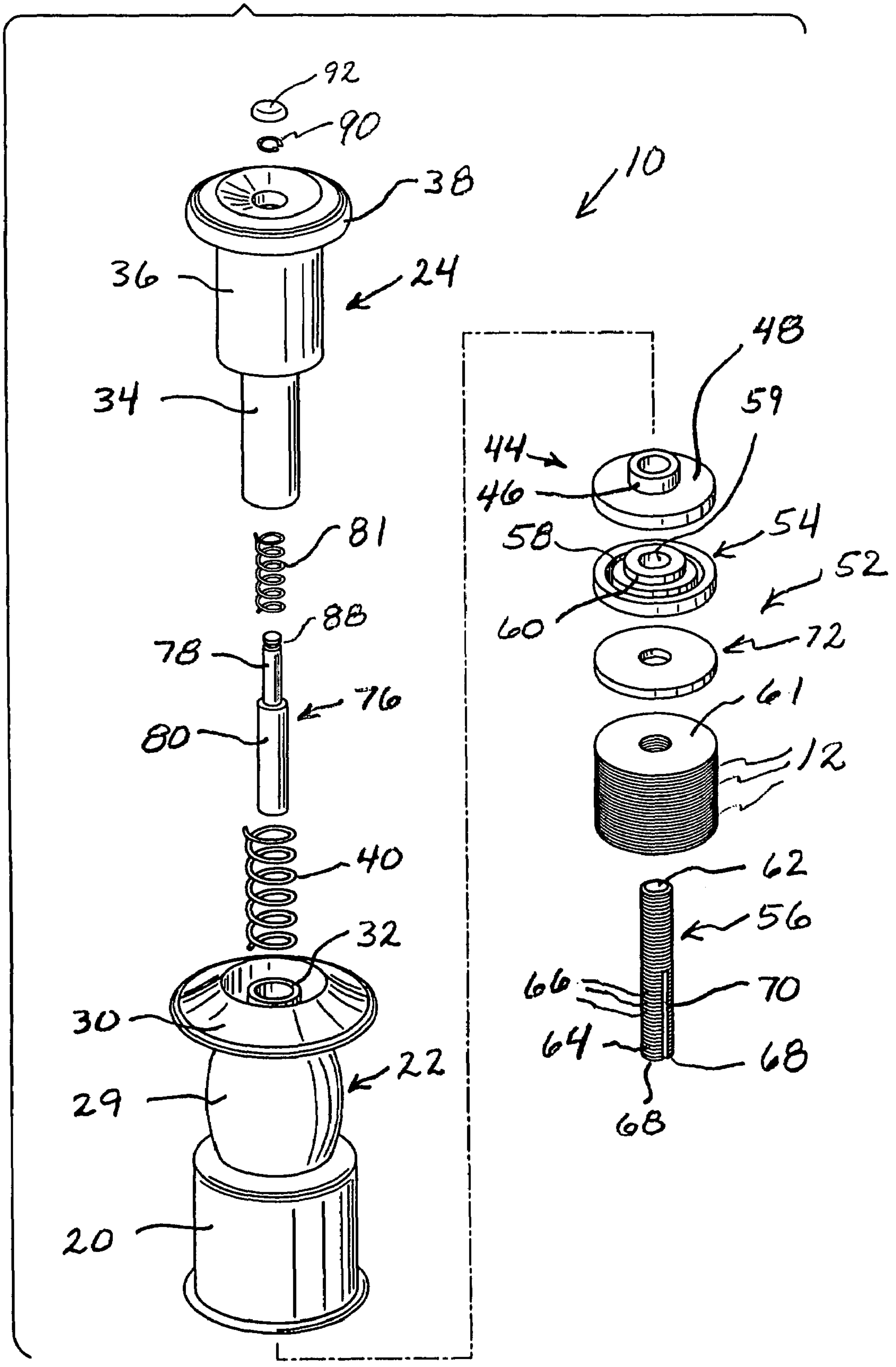
FIG. 11 is an exploded perspective view of the reinforcing ring applicator and a single, disposable reinforcer ring cartridge.

The applicator 10 is designed to receive replaceable, disposable reinforcing ring cartridges 52 which may be packaged for sale within a box 54, as illustrated in FIG. 2. As illustrated in FIGS. 4 and 11, each reinforcer ring cartridge 52 is comprised of an annular pressure or backing plate 54, a reinforcer mounting post 56, and a plurality of flat, annular reinforcing rings 12 disposed in a cylindrical, annular stack upon the mounting post 56. Each of the reinforcing rings 12 has a flat, annular undersurface 58 coated with a pressure-sensitive adhesive and an opposite flat annular top surface 61, which is preferably coated with a release agent. The reinforcing rings 12 are arranged in a stack about the mounting post 56. The reinforcing rings 12 may of the type depicted and described in U.S. Pat. No. 6,798,593, which is hereby incorporated by reference in its entirety.

The annular pressure plate 54 is formed of plastic and is a generally disc-shaped structure. A central reinforcer mounting post applicator aperture 59 is defined through the pressure or backing plate 54. The pressure plate 54 has flat, circular annular undersurface and includes a circular annular, upwardly facing channel 58 defined near its periphery on its upper surface. An annular, upwardly projecting boss 60 is also defined on the center of the upper surface of the pressure plate 54 and projects axially upwardly therefrom. The boss 60 is located concentrically within the encircling channel 58 and about the aperture 59.

The reinforcer mounting post 56 is an elongated plastic rod or shaft that has an upper end 62 and a reinforcing ring dispensing tip 64 located at its opposite, lower end. The reinforcer mounting post 56 is formed with a series of raised, annular, radially projecting ribs or corrugations 66 projecting outwardly on its outer surface throughout its circumference and axially along its length. The ribs or corrugations 66 have a sawtooth configuration, with the inclined sides thereof sloping downwardly and outwardly so as to allow incremental movement of the backing plate 54 toward, but not away from the dispensing tip 64.

Figure 10:
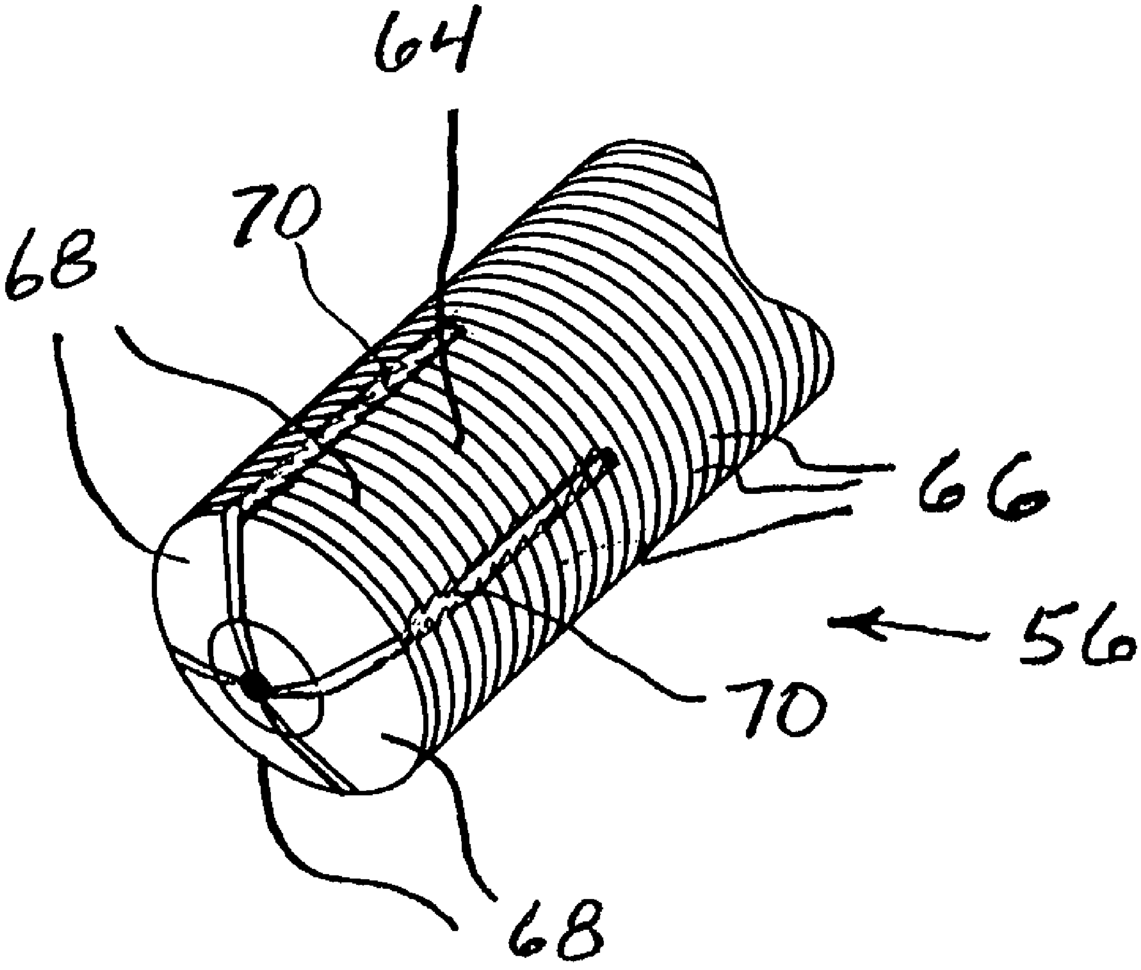
FIG. 10 is a perspective detail illustrating the lower end of the reinforcing ring mounting post and the reinforcing ring dispensing tip thereon.

The reinforcing ring dispensing tip 64 is hollow and is formed with a plurality of separate, radially inwardly deflectable, converging fingers 68 formed thereon by four radially directed, longitudinally extending slots 70 defined in its structure, as best illustrated in FIG. 10.

In the preferred embodiment of the invention, the reinforcer ring cartridge 52 also includes an annular, resilient, compressible foam pressure distribution pad 72, located between the pressure plate 54 and the reinforcing rings 12. The pressure distribution pad 72 serves to ensure the uniform application of pressure by the pressure plate 54 across the entire area of the annular reinforcing rings 12 when the plunger 24 is depressed.

The applicator 10 is also provided with a narrow diameter cartridge gauge rod 76 having a cylindrical upper end 78 of reduced diameter and a cylindrical lower end 80 of slightly larger diameter. The cartridge gauge rod 76 is disposed within the plunger in the cartridge gauge passageway 35 and is biased toward the reinforcer cartridge 52 by another compressible coil spring 81. The coil spring 81 is smaller than the main spring 40 in both length and diameter. The cartridge gauge spring 81 is located within the cartridge gauge passageway 35 in the area thereof beneath the handle 38 and above the lower end 80 of the cartridge gauge rod 76.

A radially inwardly directed retaining clip seating channel 88 is defined in the structure of the upper end 78 of the cartridge gauge rod 76. The retaining clip seating channel 88 is of a size suitable to receive a C-clip 90. The upper end 78 of cartridge gauge rod 76 is also provided with a visually prominent indicia in the form of a brightly colored, resilient plastic cap 92 that is frictionally engaged on the upper extremity of the upper end 78 of the cartridge gauge rod 76.

The handle 38 is formed with a narrow, annular, radially inwardly directed neck 84 which has an internal diameter small enough to allow free passage of the upper end 78 of the cartridge gauge rod 76, but also defines a bearing seat for the cartridge gauge spring 81. The lower end of the cartridge gauge spring 81 bears against the shoulder formed between the lower end 80 of the cartridge gauge rod 76 and the narrower, upper end 78 thereof. The cartridge gauge spring 81 normally biases the cartridge gauge rod 76 in a direction toward the reinforcement cartridge cavity 26. It is of sufficient length so that it is compressed between the underside of the radially inwardly directed annular neck 84 formed in the handle 38 and the annular shoulder defined atop the lower end 80 of the cartridge gauge rod 76.

The use and operation of both the reinforcing ring applicator 10 and the reinforcer ring cartridge 12 may be described in connection with drawing FIGS. 3–9. As illustrated in FIG. 3, the lid of the storage box 54, shown in FIG. 2, is opened to expose a new selected reinforcer ring cartridge 52 having a complete supply stack of reinforcing rings 12 on its reinforcer mounting post 56. With the lid of the reinforcer cartridge supply box 54 open, the applicator 10 is positioned directly above a selected reinforcer ring cartridge 52 in coaxial alignment therewith, as illustrated in FIG. 3. The user then forces the reinforcer applicator 10 downwardly pressing against the flange 30 of the frame 18 with a force indicated by the directional arrows 93. This forces the cartridge-engaging ring 50 on the underside of the metal cartridge-engaging plate 44 into the corresponding, upwardly facing channel 58 in the cartridge pressure or backing plate 54. The cartridge-engaging ring 50 fits tightly into the channel 58 so as to securely, but releaseably engage the reinforcer ring cartridge 52 to the reinforcing ring applicator 10 within the reinforcement cartridge cavity 26.

Preferably, the floor of the cartridge box 54 is formed with a floor mat 55 having openings beneath the centers of each of the reinforcing ring cartridges 52, as indicated in FIG. 3. The floor mat 55 thereby creates a small, shallow depression beneath the center of each reinforcer ring cartridge 52 so as to receive the tips of the fingers 68 at the lower tip 64 of the reinforcer ring mounting post 56. The provision of such a depression avoids the resilient deformation of the fingers 68 when the reinforcer ring cartridge 52 is coupled to the reinforcing ring applicator 10. This thereby avoids dislodgement of the lowermost reinforcing ring 12 when the reinforcer ring cartridge 52 is coupled to the reinforcing ring applicator 10.

Preferably also, each reinforcer ring cartridge 52 is provided with a flat, annular disc of paper (not shown) having a release coating on the upper surface thereof, positioned beneath the lowermost reinforcing ring 12 when the reinforcer ring cartridges 52 are packaged as illustrated in FIG. 2. The provision of such a release-coated wafer prevents the lowermost reinforcing ring 12 from sticking to the bottom of the floor of the reinforcer box 54 when the reinforcer ring cartridge 52 is attached to the applicator 10. Once the reinforcer ring cartridge 52 had been coupled to the reinforcing ring applicator 10 as described, the applicator 10 is loaded and ready for use in the condition as illustrated in FIG. 4.

Figure 5:
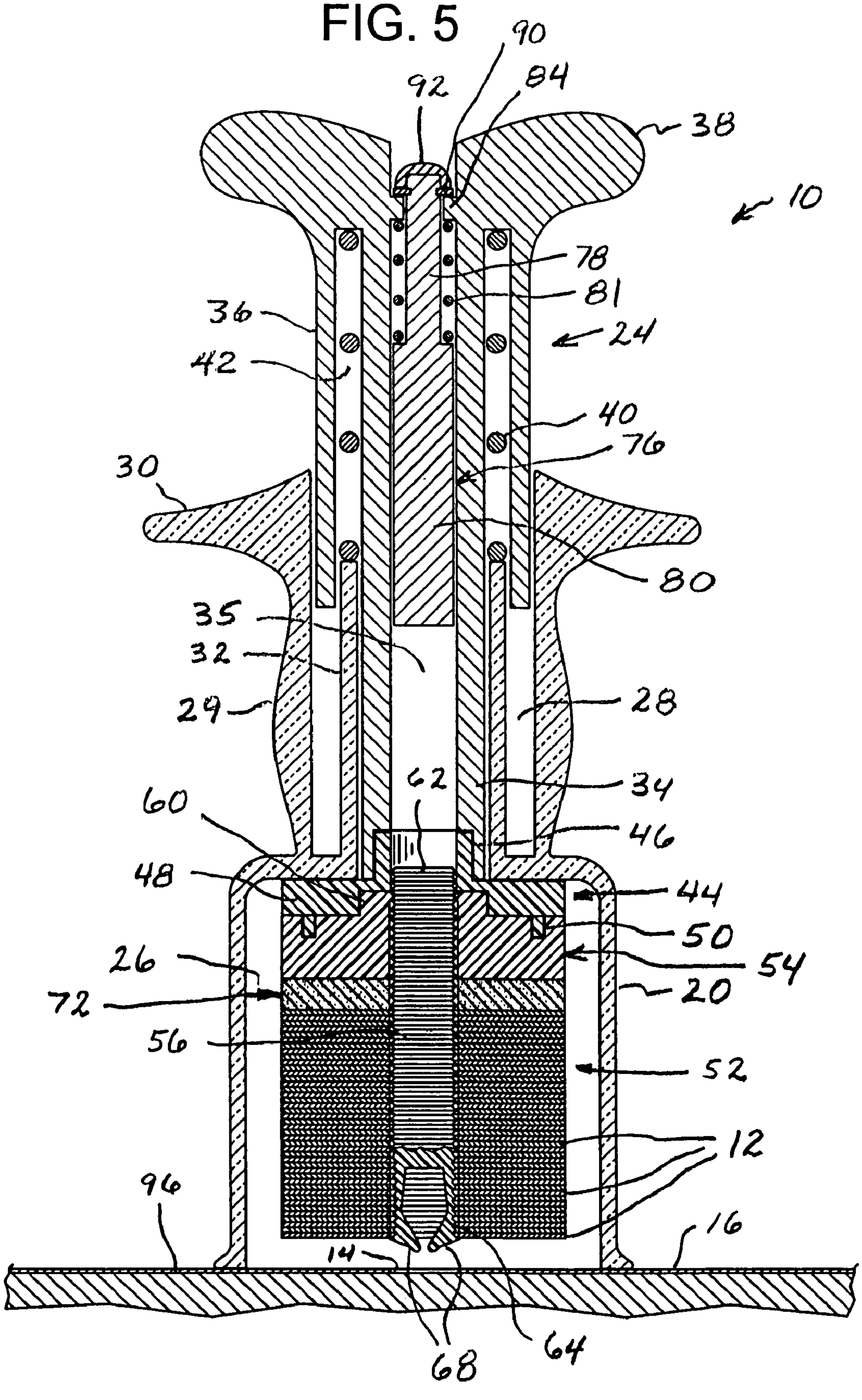
FIG. 5 is a sectional elevational view illustrating the positioning of the applicator relative to the sheet of material shown in FIG. 1 in preparation for application of a reinforcing ring thereto.

To utilize the loaded applicator 10, the frame 18 is positioned directly above a perforation 14 in a flat sheet of material, such as the paper 16. The applicator 10 is positioned directly atop the sheet of paper 16 with the reinforcer mounting post 56 coaxially aligned with the aperture 14 and with the lower edge of the applicator frame skirt 20 resting on the sheet of paper 16, as illustrated in FIG. 5. Downward pressure is thereupon exerted on the handle 38 of the plunger 24 as indicated by the directional arrows 94 in FIG. 6. This downward pressure overcomes the bias of the main spring 40, thereby compressing it. The plunger 24 is pushed downwardly with the annular backing plate 54 applying pressure to compress the annular pad 72 uniformly across the surface area of the reinforcing rings 12.

Figure 6:
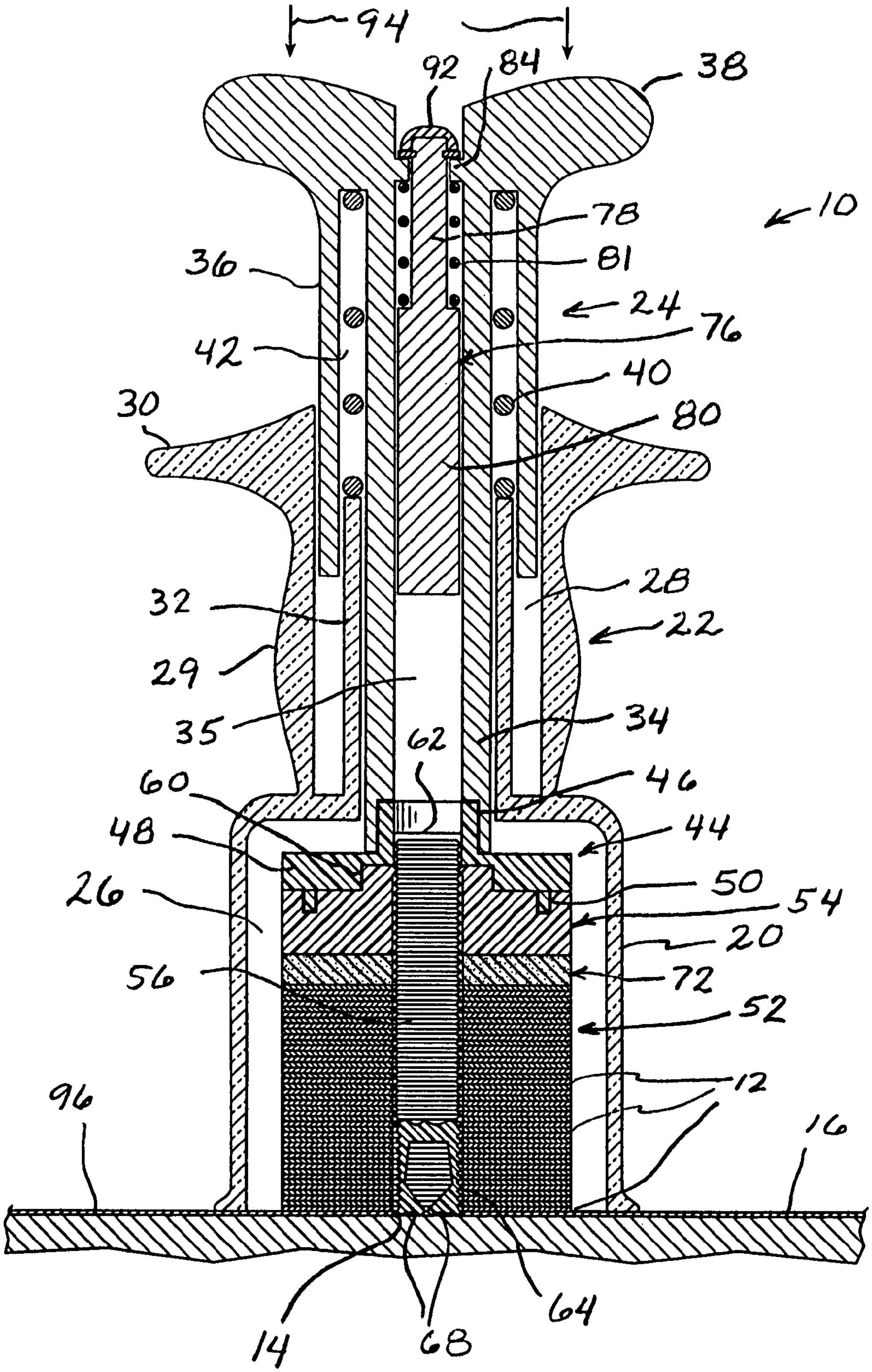
FIG. 6 is a sectional elevational view illustrating depression of the applicator plunger and affixation of the lowermost reinforcing ring to the sheet of material.

As the lower ring dispensing end 64 of the reinforcer mounting post 56 is pushed downwardly through the aperture 14, the downwardly projecting tips of the mounting post fingers 68 make contact with the underlying supporting surface 96 located beneath the sheet of paper 16. The downward force on the mounting post 56 resiliently deflects the fingers 68 radially inwardly toward each other, as illustrated in FIG. 6, thereby radially retracting the lowest ribs or corrugations 66 and releasing the lowermost reinforcing ring 12 from the lowermost annular rib 66.

Figure 7:
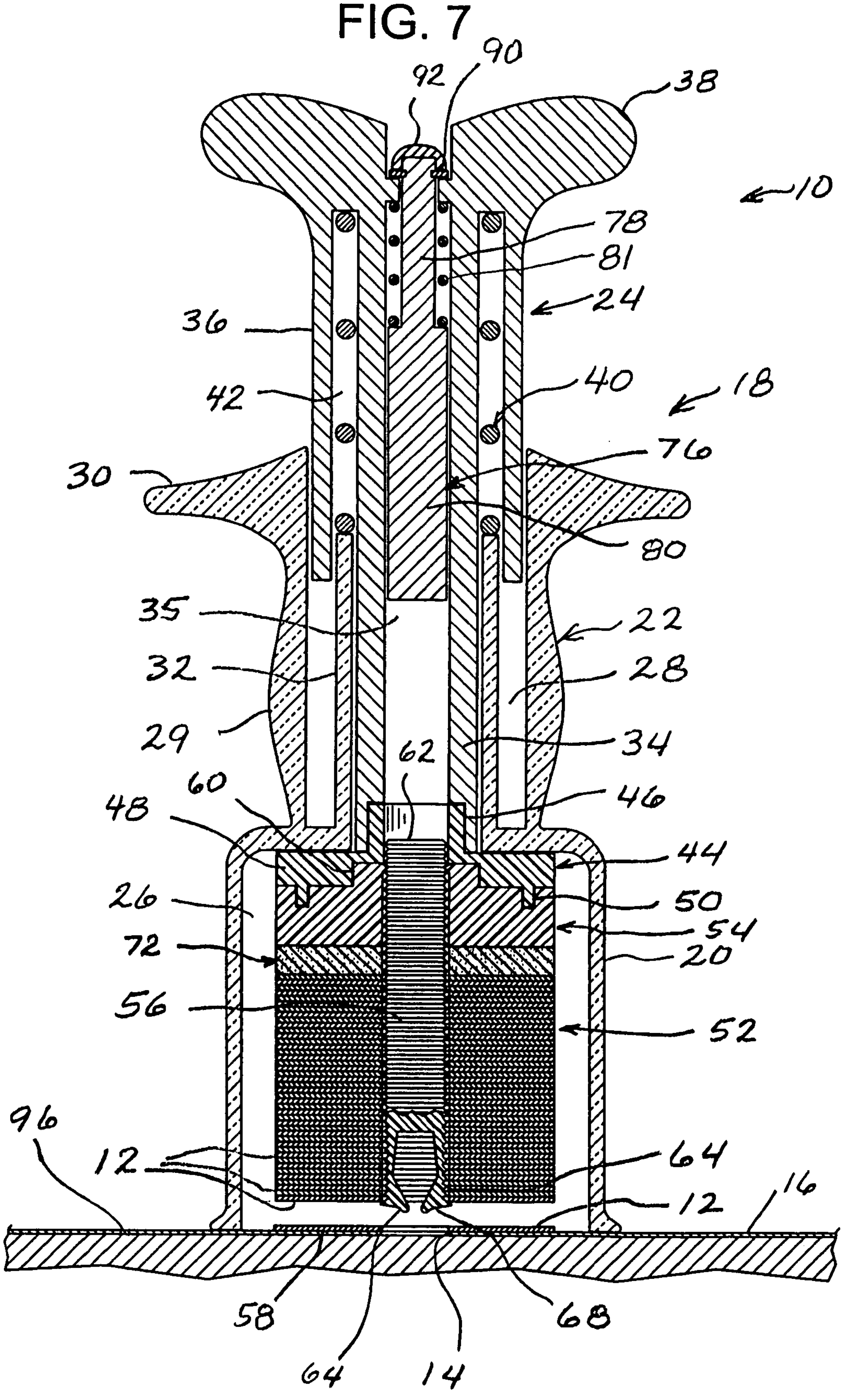
FIG. 7 is a sectional elevational view illustrating withdrawal of the applicator plunger following detachment of the bottom reinforcing ring from the cartridge ring mounting post.

Because the undersurfaces of the reinforcing rings 12 are all coated with a pressure-sensitive adhesive, the lowermost reinforcing ring 12 will adhere to the upper surface of the sheet of paper 16 in the area immediately surrounding the perforation 14. Consequently, the lowermost reinforcing ring 12 will separate from the lower end 64 of the reinforcing ring mounting post 56 as the handle 38 of the plunger 24 is released and the main spring 40 retracts the plunger 24 and pushes it back upwardly relative to the applicator frame 18, as illustrated in FIG. 7. The lowermost reinforcing ring 12 will easily separate from the reinforcing ring 12 located immediately above it, which is retained on the mounting post 56 by the lowermost retaining rib 66 of the mounting post 56. The detached retaining ring 12 is thereupon adhesively secured to the surface of the paper 16 surrounding the perforation 14 therein, as illustrated in FIGS. 1 and 7.

The separation of the lowermost reinforcing ring 12 is facilitated by the release coating on its upper surface 61. As the downward pressure on the plunger handle 38 is removed, the resiliently deflected fingers 68 will return to their undeformed positions, thereby bringing the lowermost retaining rib 66 back outwardly to engage the retaining ring 12 remaining at the bottom of the stack of rings, as illustrated in FIG. 7.

The supply of reinforcing rings 12 on the reinforcer ring cartridge 52 may be sequentially and rapidly applied about perforations 14 in sheets of material 16 until the stack of reinforcing rings 12 has been exhausted. As each reinforcing ring 12 is applied and detached from the stack of rings remaining on the mounting post 56, the downward force 94 applied to the stack of reinforcing rings 12 by the backing plate 54 incrementally pushes the reinforcing rings 12 past the retaining ribs 66 on the mounting post 56. The backing plate 54 is thereby progressively and incrementally advanced downwardly along the mounting post 56 as the reinforcing rings 12 are detached from it and applied to the paper 16.

Figure 8:
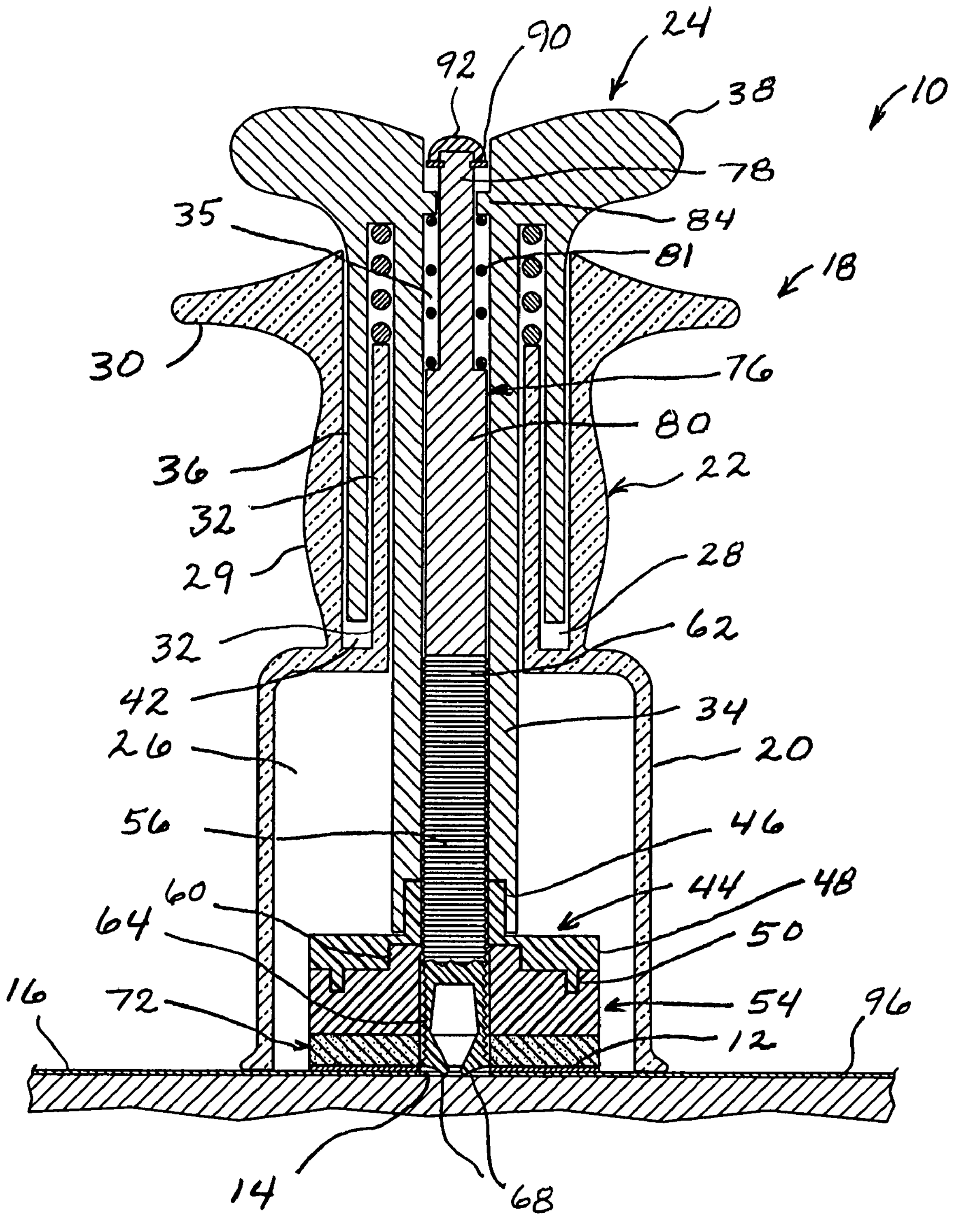
FIG. 8 is a sectional elevational view illustrating application of the last reinforcing ring from a cartridge of reinforcers.

As the supply of reinforcing rings 12 on the reinforcer ring cartridge 52 is depleted, the stroke of the plunger 24 becomes longer and longer, in order to apply sufficient downward pressure from the backing plate 54 onto the retaining rings 12 remaining in the stack. As the supply of reinforcing rings 12 on the mounting post 56 nears depletion, as illustrated in FIG. 8, depression of the plunger 24 causes the mounting post 56 to be forced sufficiently far up through the annular backing member 54 so that the upper end 62 of the mounting post 54 pushes against the lower end 80 of the cartridge gauge rod 76, as illustrated in FIG. 8. The upward force of the upper end 62 of the reinforcing ring mounting post 56 against the lower end 80 of the cartridge gauge rod 76 forces the upper end 78 of the cartridge gauge rod 76 upwardly, overcoming the bias of the cartridge gauge spring 81, thereby compressing the cartridge gauge spring 81 further.

As illustrated in FIG. 8, the cartridge gauge spring 81 is compressed between the shoulder formed at the top of the lower end 80 and the retaining neck 84. As the supply of reinforcing rings 12 is exhausted, the downward stroke of the plunger 24 relative to the frame 18 causes the upper end 78 of the cartridge gauge rod 76 to be pushed up out of the central depression in the handle 38, as illustrated in FIG. 8.

Figure 9:
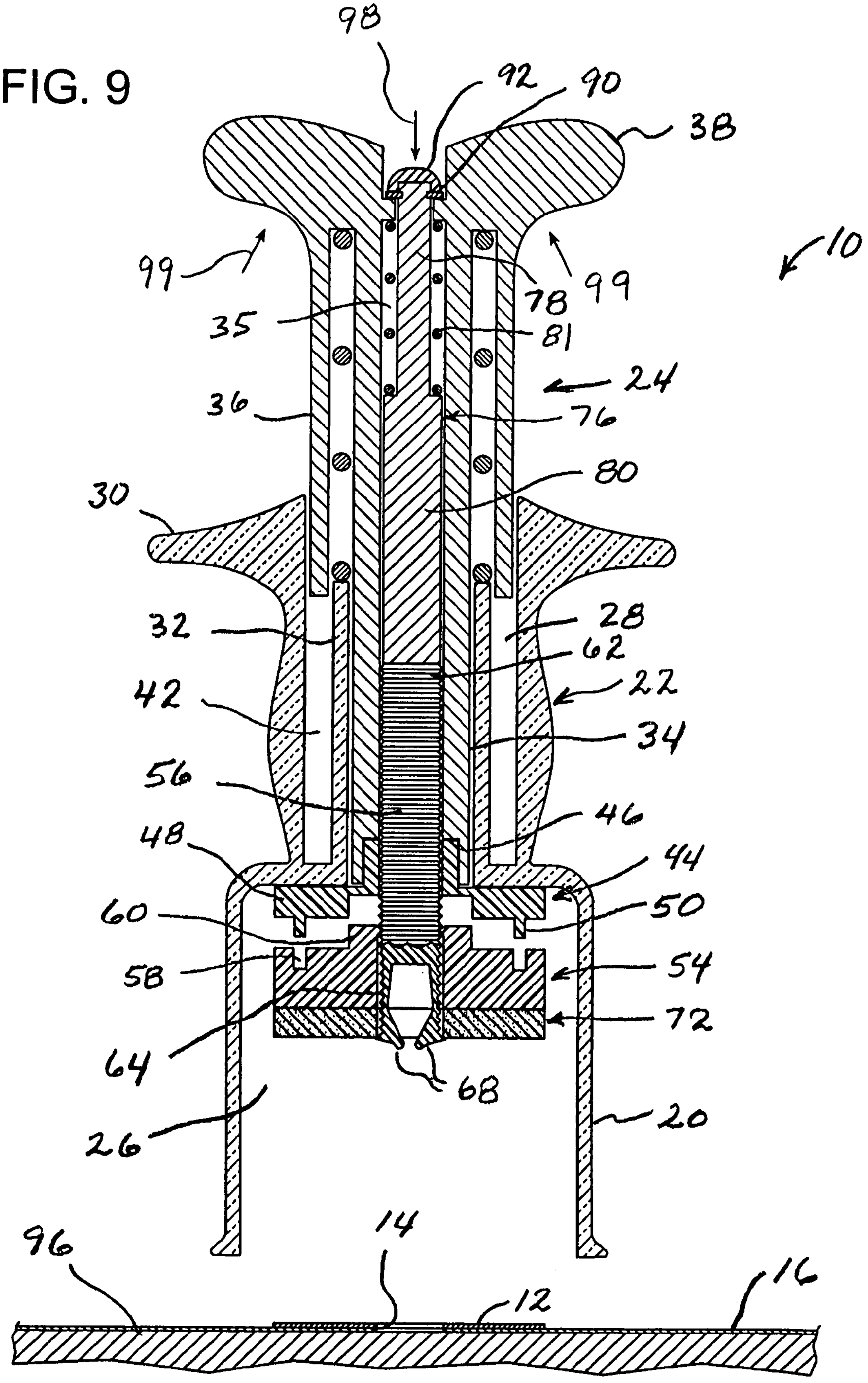
FIG. 9 is a sectional elevational view illustrating ejection of a spent reinforcing ring cartridge.

Since the brightly colored cap 92 thereupon becomes readily visible, the user is warned that the supply of reinforcing rings 12 is exhausted, or nearly exhausted. The user must then eject the spent reinforcer ring cartridge 52 from the applicator 10, as illustrated in FIG. 9. As shown in that drawing figure, this is accomplished by pressing downwardly on the cap 92 on the upper end 78 of the cartridge gauge rod 76, as illustrated by the directional arrow 98, while pressing upwardly against the underside of the handle 38, as indicated by the directional arrows 99.

The downward force on the cartridge gauge rod 76, applied as shown at 98 in FIG. 9, is sufficient to overcome the bias of the cartridge gauge spring 81 and compress it substantially, thereby pushing the reinforcing ring mounting rod 56 downwardly, away from the grip portion 22 of the applicator frame 18. This results in longitudinal, downward movement of the reinforcing ring mounting post 56 relative to the reinforcer cartridge mount 44. This force is sufficient to pull the pressure plate 54 away from the reinforcer cartridge mount 44 so that the annular ring 50 is pulled out and separates from the channel 58, as illustrated in FIG. 9. The spent cartridge 52 thereupon drops out of the bottom of the skirt portion 20 of the applicator 10, as indicated in FIG. 9.

The applicator 10 is thereupon ready to receive a another reinforcer ring cartridge 52, as illustrated in FIG. 3. The applicator 10 may be utilized repeatedly in this manner, with spent cartridges 52 being discarded and replaced with fresh disposable reinforcer ring cartridges 52, loaded with a fresh supply of reinforcing rings 12, as illustrated in FIG. 3.

Undoubtedly, numerous variations and modifications of the invention will become readily apparent to those familiar with devices for applying reinforcing rings about perforations in sheets of material. Equivalent components may be substituted for those illustrated in the preferred embodiment of the invention depicted and described. For example, the coil springs 40 and 81, could be replaced with compressible foam springs or a pneumatic biasing system. Also, various cartridge-engaging projections and recesses may be employed for releaseably attaching cartridges to the applicator of the invention. Accordingly, the scope of the invention is not limited to the specific embodiment depicted and described, but rather is defined in the claims appended hereto.

I claim:

1. An applicator for applying reinforcing rings about perforations in sheet material comprising:

an upright annular frame including a lower skirt portion forming a lower reinforcement cartridge cavity therewithin and an upper grip portion forming an annular plunger cavity directly above said reinforcement cartridge cavity and in coaxial alignment therewith, a plunger mounted in said upright frame for reciprocal movement in said plunger cavity and having a lower extremity with a cartridge-engaging member, a spring biasing said plunger relative to said frame toward a retracted position protruding upwardly from said frame and away from said reinforcement cartridge cavity, a reinforcer ring cartridge including an annular backing plate releaseably attached to said cartridge-engaging member of said plunger, a reinforcer mounting post mounted to said backing member and having a corrugated cylindrical outer surface and a lower tip formed with a plurality of separate, downwardly and radially inwardly directed, resilient deflectable fingers projecting therefrom, and a supply of a plurality of flat, annular reinforcing rings each having an undersurface coated with a pressure-sensitive adhesive and a top surface coated with a release agent stacked atop each other about said reinforcer mounting post, wherein said reinforcing rings are engaged by friction on said corrugated surface of said reinforcer mounting post and are advanced along said reinforcer mounting post toward said lower tip of said mounting post by depression of said plunger by resilient, radially inward flexure of said fingers of said mounting post tip, whereby the lowermost of said reinforcing rings is detached from said reinforcer mounting post when pressed against a flat sheet of material located therebeneath and attached to said flat sheet of material by depression of said plunger against said reinforcer cartridge backing plate.

2. An applicator for applying reinforcing rings according to claim 1 wherein said cartridge-engaging member and said annular backing member have facing surfaces one of which is provided with at least one longitudinally projecting member and the other of which is provided with at least one longitudinally extending mating recess, whereby said backing member is held to said cartridge-engaging member by frictional force upon insertion of said longitudinally projecting member into said mating recess.

3. An applicator for applying reinforcing rings according to claim 2 wherein said backing member has a central, axial aperture therethrough, and said reinforcer mounting post is engaged in said central axial aperture of said backing member solely by the force of friction whereby said mounting post is forced back and advanced through said backing member and toward said plunger cavity in incremental steps as each of said reinforcing rings is dispensed from said mounting post.

4. An applicator for applying reinforcing rings according to claim 3 wherein said plunger is a hollow, tubular structure, and further comprising a cartridge gauge rod having upper and lower ends and disposed within said plunger and biased toward said reinforcer cartridge, whereby as said supply of reinforcing rings nears depletion, said reinforcer mounting post is forced sufficiently far up through said annular backing member so that it pushes against said lower end of said cartridge gauge rod, forcing said upper end of said cartridge gauge rod up out of said plunger as said plunger is depressed against said reinforcer cartridge backing plate.

5. An applicator for applying reinforcing rings according to claim 4 wherein said upper end of said cartridge gauge rod is provided with a visually prominent indicia.

6. An applicator for applying reinforcing rings according to claim 3 wherein said ring dispensing tip is hollow and is divided into said converging fingers by a plurality of radially directed, longitudinally extending slots.

7. An applicator for applying reinforcing rings according to claim 6 wherein said ring dispensing tip is formed with four of said converging fingers.

8. An applicator for applying reinforcing rings according to claim 7 further comprising an annular resilient pressure distribution pad located between said backing plate and said reinforcing rings.

9. An applicator for applying reinforcing rings according to claim 3 wherein said backing plate is lodged in frictional engagement with radially aligned corrugations on said exterior of said mounting post and is longitudinally advancable only in a direction toward said lower tip in increments by the repeated application of longitudinal force on said backing plate toward said lower tip.

* * * * *